United States Patent
Eisele et al.

(10) Patent No.: US 10,971,772 B2
(45) Date of Patent: Apr. 6, 2021

(54) STORAGE MODULE HAVING HEATING MEASURES

(71) Applicant: Bayerische Motoren Werke Aktiengesellschaft, Munich (DE)

(72) Inventors: Marc-Thomas Eisele, Munich (DE); Juergen Hildinger, Hoehenkirchen-Siegertsbrunn (DE); Christian Kulp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 32 days.

(21) Appl. No.: 16/213,316

(22) Filed: Dec. 7, 2018

(65) Prior Publication Data

US 2019/0109351 A1     Apr. 11, 2019

Related U.S. Application Data

(63) Continuation of application No. PCT/EP2017/063650, filed on Jun. 6, 2017.

(30) Foreign Application Priority Data

Jun. 8, 2016 (DE) ..................... 10 2016 210 142.0

(51) Int. Cl.
*H01M 10/637* (2014.01)
*H01M 10/615* (2014.01)
(Continued)

(52) U.S. Cl.
CPC ..... *H01M 10/637* (2015.04); *H01M 10/0481* (2013.01); *H01M 10/615* (2015.04);
(Continued)

(58) Field of Classification Search
CPC ........... H01M 10/6571; H01M 10/615; H01M 10/637; H01M 50/20; H01M 50/502
See application file for complete search history.

(56) References Cited

U.S. PATENT DOCUMENTS 6,055,252 A * 4/2000 Zhang ..................... H01S 5/068
372/26
2009/0286143 A1 11/2009 Matthias et al.
(Continued)

FOREIGN PATENT DOCUMENTS

DE     10 2007 042 404 A1     3/2009
DE     10 2011 076 624 A1     11/2012
(Continued)

OTHER PUBLICATIONS

International Search Report (PCT/ISA/210) issued in PCT Application No. PCT/EP2017/063650 dated Aug. 28, 2017 with English translation (five (5) pages).
(Continued)

*Primary Examiner* — Jonathan G Jelsma
(74) *Attorney, Agent, or Firm* — Crowell & Moring LLP

(57) ABSTRACT

A storage module stores electrical energy. The storage module has a first storage cell and a second storage cell, each having a positive terminal and a negative terminal. The storage module includes a contact bridge, which connects one terminal of the first storage cell to one terminal of the second storage cell in an electrically conductive manner. The contact bridge is designed to reduce an electrical resistance between the electrically connected terminals of the first storage cell and of the second storage cell with rising temperature.

12 Claims, 1 Drawing Sheet

(51) Int. Cl.
*H01M 10/6571* (2014.01)
*H01M 50/20* (2021.01)
*H01M 50/502* (2021.01)
*H01M 10/625* (2014.01)
*H01M 10/04* (2006.01)

(52) U.S. Cl.
CPC ..... *H01M 10/625* (2015.04); *H01M 10/6571* (2015.04); *H01M 50/20* (2021.01); *H01M 50/502* (2021.01); *H01M 2220/20* (2013.01); *Y02P 70/50* (2015.11)

(56) References Cited

U.S. PATENT DOCUMENTS

| | | | | |
|---|---|---|---|---|
| 2011/0012707 | A1* | 1/2011 | Koto | H01C 7/043 338/22 R |
| 2013/0323548 | A1 | 12/2013 | Iwamoto | |
| 2014/0069690 | A1 | 3/2014 | Diez et al. | |
| 2015/0229011 | A1* | 8/2015 | Gless | H01M 10/613 62/3.2 |
| 2017/0025723 | A1* | 1/2017 | Isozaki | H01M 10/625 |

FOREIGN PATENT DOCUMENTS

| | | |
|---|---|---|
| DE | 10 2011 104 000 A1 | 12/2012 |
| DE | 10 2014 202 549 A1 | 8/2015 |
| DE | 10 2015 010 925 A1 | 3/2016 |
| EP | 1 371 070 A1 | 12/2003 |
| JP | 2009-118729 A | 5/2009 |
| JP | 2010-67386 A | 3/2010 |

OTHER PUBLICATIONS

German-language Written Opinion (PCT/ISA/237) issued in PCT Application No. PCT/EP2017/063650 dated Aug. 28, 2017 (seven (7) pages).

German-language Search Report issued in counterpart German Application No. 10 2016 210 142.0 dated Jan. 20, 2017 (five (5) pages).

* cited by examiner

Fig. 1A
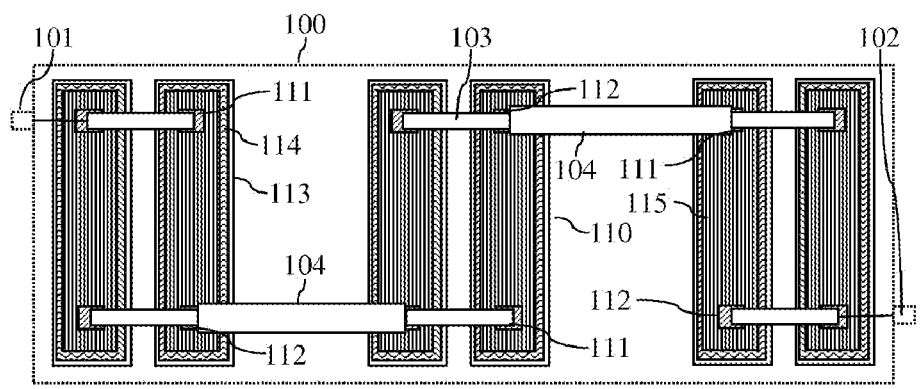
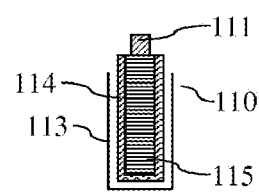
Fig. 1B
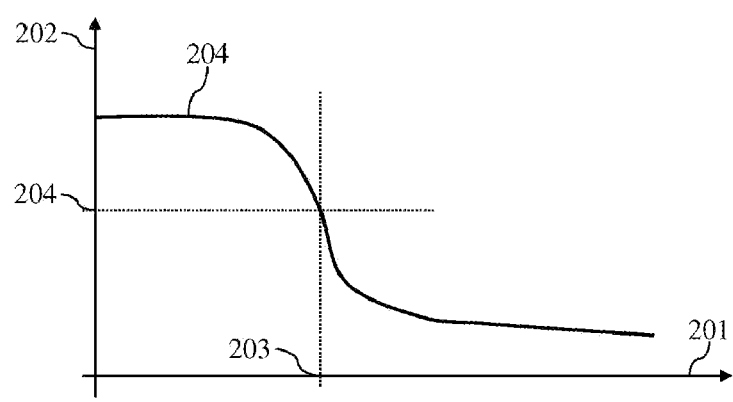
Fig. 2

STORAGE MODULE HAVING HEATING MEASURES

CROSS REFERENCE TO RELATED APPLICATIONS

This application is a continuation of PCT International Application No. PCT/EP2017/063650, filed Jun. 6, 2017, which claims priority under 35 U.S.C. § 119 from German Patent Application No. 10 2016 210 142.0, filed Jun. 8, 2016, the entire disclosures of which are herein expressly incorporated by reference.

BACKGROUND AND SUMMARY OF THE INVENTION

The invention relates to a storage module having a plurality of storage cells, and having measures for heating said storage cells.

Storage modules are employed e.g. in vehicles, in order to store electrical energy for the propulsion of said vehicles. A storage module typically comprises a plurality of storage cells (e.g. lithium-ion-based storage cells) which, depending upon voltage and/or capacity requirements, are mutually coupled in parallel and/or in series.

The electric power which can be taken up or delivered by a storage module typically decreases in accordance with the temperature of the storage module. In the event of a cold start-up of a vehicle in winter, for example, this can result in restrictions with respect to the available drive power of the vehicle.

Consequently, as described e.g. in US2013/0323548A1, a storage module can incorporate a dedicated heating system in order to raise the temperature of the storage module. Thus, even at low external temperatures, the take-up or delivery of relatively high electrical power is possible. However, the provision of a dedicated heating system requires a relatively large structural space in a storage module, and is associated with additional costs and with additional weight. Moreover, the operation of a dedicated heating system results in electrical energy losses, and a consequent reduction in the range of an electrically-propelled vehicle.

The present document addresses the technical object of the provision of a storage module having energy-, space-, weight- and cost-efficient measures for heating the storage cells of the storage module.

According to one aspect, a storage module for the storage of electrical energy is described. The storage module can be designed to deliver electrical energy for the propulsion of an electrically-propelled motor road vehicle. For example, a module voltage of 400 V or higher can be present on terminals of the storage module.

The storage module includes a first storage cell and a second storage cell, each having a positive terminal and a negative terminal. A storage cell can be e.g. a lithium-ion-based storage cell. The storage module typically includes a plurality of storage cells which, depending upon requirements for storage capacity, for the module current of the storage module and/or for the module voltage of the storage module, can be at least partially mutually connected in parallel and/or at least partially mutually connected in series.

The storage module can include a housing, in which the first storage cell and the second storage cell (or the plurality of storage cells) are arranged. The storage module can have a positive terminal and a negative terminal, which are constituted by a positive terminal of one storage cell or by a negative terminal of one storage cell.

The storage module further includes a contact bridge, which connects one terminal of the first storage cell to one terminal of the second storage cell in an electrically conductive manner. The contact bridge is designed herein to reduce the electrical resistance between the electrically connected terminals of the first storage cell and the second storage cell, as the temperature rises. Specifically, at relatively low temperatures (e.g. in the region of −30° C. to −10° C.), the contact bridge can provide relatively high electrical resistance. Conversely, at relatively high temperatures (e.g. in the region of 10° C. to 30° C.), the contact bridge can provide relatively low electrical resistance.

By providing a contact bridge having temperature-dependent electrical resistance, the storage cells of the storage module, at low temperatures, can automatically be heated by the currents between the storage cells. Conversely, at relatively high temperatures (specifically at typical operating temperatures of the storage module), internal losses in the storage module can be restricted. Space-, cost-, weight- and energy-efficient heating for the storage module can be provided accordingly.

The (at least one) contact bridge can connect the positive terminal of the first storage cell to the negative terminal of the second storage cell in an electrically conductive manner. Conversely, the (at least one) contact bridge can connect the negative terminal of the first storage cell to the positive terminal of the second storage cell in an electrically conductive manner. By way of the contact bridge, a series circuit arrangement of storage cells can thus be provided, such that at least a proportion of the module current flows via the contact bridge and thus (at relatively low temperatures) generates a thermal power loss which can be employed for the heat-up of the storage cells. Exceptionally efficient heating can be provided accordingly.

Specifically, the storage module can include a plurality of groups of one or more storage cells. The one or more storage cells in a group can be herein configured in a mutually parallel arrangement. The groups can be respectively mutually coupled by a contact bridge (having temperature-dependent resistance), in order to constitute a series circuit arrangement of the groups of one or more storage cells. Accordingly, a plurality of contact bridges can be provided for heating the storage cells of a storage module.

The storage module can be designed to deliver a module current on the terminals of the storage module. The one or more contact bridges are typically arranged such that at least a proportion of the module current, or the entire module current, flows via the one or more contact bridges. Heating capacity within the storage module can be increased, specifically maximized, accordingly.

A contact bridge can be designed to reduce the electrical resistance between a first temperature and a second temperature by a factor of 2, 3, 4 or more. The first temperature herein preferably lies between −30° C. and −10° C. and/or the second temperature lies between 10° C. and 30° C. High heating capacities firstly (at low temperatures) and low power losses (at high temperatures) can be delivered accordingly.

A contact bridge can comprise one or more materials having specific electrical resistance, which shows a negative temperature coefficient. Exemplary materials are as follows: a metal oxide, specifically of manganese, nickel, cobalt, iron, copper and/or titanium; a semiconductor material, specifically silicon, germanium, boron, selenium and/or tellurium; and/or a bonding semiconductor, specifically gallium arsenide, indium phosphide, indium antimonide, indium arsenide, etc.

Alternatively or additionally, the contact bridge can be designed to reduce contact resistance between one terminal of a storage cell and the contact bridge as the temperature rises. To this end, the contact bridge can comprise a contact part and compression devices, wherein the compression devices are designed such that a force with which the contact part is compressed against one terminal of a storage cell rises as the temperature rises (thereby reducing the contact resistance between terminal and contact part). For example, the compression device can comprise a bimetallic strip in or on the contact part. Alternatively or additionally, the compression device can comprise a compression spring having temperature-dependent expansion, which compression spring is designed to compress the contact part against one terminal of a storage cell.

The storage cells can respectively include a cell winding, which is directly connected to the positive and the negative terminal, and which is at least partially enclosed by an insulating layer and/or a cell container. The direct connection between the terminals and the cell winding permits exceptionally efficient transmission of thermal energy from the contact bridge to the interior of the storage cells, for the heat-up of said storage cells.

According to a further aspect, a vehicle (specifically a motor road vehicle, e.g. a private car, a heavy goods vehicle or a motorcycle) is described, which vehicle incorporates the storage module described in the present document. The vehicle can have an electric drive, which is operated by electrical energy from the storage module.

It should be observed that the devices and systems described in the present document can be employed in isolation, or in combination with other devices and systems described in the present document. Moreover, any aspects of the devices and systems described in the present document can be mutually combined in a variety of ways. Specifically, the characteristics of the claims can be mutually combined in a variety of ways.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1A shows an exemplary storage module, in an overhead view of the terminals of the storage cells.

FIG. 1B shows an exemplary storage cell, in a side view.

FIG. 2 shows an exemplary resistance characteristic between the terminals of two storage cells in a storage module.

DETAILED DESCRIPTION OF THE DRAWINGS

As described above, the present document addresses the provision of energy-, space-, weight- and cost-efficient heating for an electrical storage module, specifically for a storage module for the storage of electrical energy for the propulsion of a motor road vehicle.

FIG. 1A shows an exemplary storage module 100 having a plurality of storage cells 110. In the example represented, two storage cells 110 respectively are configured in a mutually parallel arrangement by use of contact bridges 103 (specifically in order to increase the capacity of the storage module 100). Moreover, groups of parallel-connected storage cells 110 are connected in series (specifically in order to increase the rated voltage of the storage module 100).

As represented in FIGS. 1A and 1B, a storage cell 110 comprises a cell winding 115, which is enclosed in an insulating layer 114 and a (typically metallic) cell container 113. A storage cell 110 further has a positive terminal 111 and a negative terminal 112. A cell voltage is obtained between the positive terminal 111 and the negative terminal 112. A cell current also flows to the terminals 111, 112 (either a charging current which is infed to the storage cell 110, or a discharge current which is tapped from the storage cell 110).

The positive terminal 111 of a first storage cell 110 in the series-connected arrangement of storage cells 110 constitutes a positive terminal 101 of the storage module 100, and the negative terminal 112 of a last storage cell 110 in the series-connected arrangement of storage cells 110 constitutes a negative terminal 102 of the storage module 100. A module voltage is obtained between the positive terminal 101 and the negative terminal 102 of the storage module 100 (which module voltage corresponds to the sum of the cell voltages of the series-connected storage cells 110). Moreover, a module current flows to the terminals 101, 102 of the storage module 100 (which module current corresponds to the sum of the cell currents of the mutually parallel-connected storage cells 110).

As the temperature falls, the electric power which can be taken up or delivered by the storage cells 110 of a storage module 100 typically decreases. It can therefore be necessary to provide a heating system for heating the storage cells 110 of a storage module 100, and thus to increase the electric power of the storage cells 110, even at low ambient temperatures. A heating system can include e.g. heating wires, which are arranged on the external walls of the storage cells 110 (specifically on the cell containers 113), and which are provided with an external electrical energy supply. However, a heating system of this type is associated with additional costs and additional weight, and requires additional structural space in a storage module 100. Moreover, a heating system of this type, on the grounds of the relatively large distance between cell winding 115 and heating wires, typically has a relatively low energy efficiency.

FIG. 1A shows contact bridges 104, which are employed as a heating measure and which are arranged directly in the module current path of a storage module 100, and which can thus be operated in an energy-efficient manner. The contact bridges 104 are designed to bond a negative terminal 112 of a group of storage cells 110 to a positive terminal 111 of a succeeding group of storage cells 110 (and vice versa), in order to construct a series-connected arrangement of groups of storage cells 110.

The contact bridges 104 exhibit temperature-dependent electrical resistance. As represented in FIG. 2, the electrical resistance 202 decreases as the temperature 201 rises. Accordingly, at a relatively low temperature 201, the contact bridges 104 exhibit relatively high electrical resistance 202 and thus, at a relatively low temperature 201, generate relatively high thermal losses, which can be employed for the heating of the storage cells 110. Conversely, at a relatively high temperature 201, the contact bridges 104 exhibit relatively low electrical resistance 202, such that the storage module 100 can be operated in an energy-efficient manner at relatively high temperatures 201 (specifically at operating temperatures 203 of a storage module 100 e.g. in the range of 20° C. to 40° C.).

By providing contact bridges 104 having temperature-dependent resistance 202 with a negative temperature coefficient, the storage cells 110 of a storage module 100 can be heated automatically, without the necessity of providing a dedicated heating system for this purpose. The requisite structural space and costs can be reduced accordingly. Moreover, the contact bridges 104 are arranged directly on the terminals 111, 112 of the storage cells 110, such that the thermal energy generated on the contact bridges 104 can be guided to the cell winding 115, and thus to the interior region of the storage cells 110, in an efficient manner.

FIG. 2 shows an exemplary characteristic 204 of the electrical resistance 202 as a function of the temperature 201. At temperatures 201 below the target operating temperature 203 of a storage cell 110, the electrical resistance 202 can exceed a resistance threshold value 204. Conversely, at temperatures 201 in excess of the target operating temperature 203, the electrical resistance 202 can lie below the resistance threshold value 204.

A contact bridge 104 having temperature-dependent resistance 202 can be provided by employing one or more materials, which have a specific resistance with a (substantially) negative temperature coefficient. In other words, so-called thermal conductors can be employed as materials for the provision of a contact bridge 104 (specifically for the construction of the series-connected arrangement of storage cells 110).

Alternatively or additionally, the electrical resistance 202 of a contact bridge 104 can be varied mechanically. For example, the contact bridge 104 can incorporate a contact part for engagement with a terminal 111, 112 of a storage cell 110, wherein the contact surface and/or the contact pressure between the contact part and the terminal 111, 112 varies with the temperature, in order to deliver temperature-dependent contact resistance between the contact part and the terminal 111, 112.

For example, a contact bridge 104 (also described as a cell contacting system) can be designed in the form of a bimetallic strip and, in a self-controlled manner, by the resulting bending of the bimetallic component, can compress a cell contact 111, 112 (also described as a cell terminal) with variable force. Accordingly, at a low temperature 201, the compression force is low, and thus the contact resistance, and the heating effect, are relatively high. As the temperature 201 rises, the compression force increases, and the resistance 202 or the heating effect are reduced accordingly. Moreover, a bimetallic spiral can be employed, the expansion of which increases as the temperature 201 rises, and thereby exerts an increased compression force on a cell terminal 111, 112.

The storage cells 110 can thus be electrically contacted by way of a cell contacting system 104. As the cell contacting system 104 is fitted to the terminals 111, 112 which are directly bonded to a cell winding 115, the thermal conduction path from the cell contacting system 104 to the cell winding 115 is relatively favorable. By the appropriate configuration of the electrical resistance 202 on the contact point between a terminal 111, 112 and the cell contacting system 104 and/or by the configuration of the electrical resistance 202 within the cell contacting system 104, and the resulting thermal generation, a heating system for the storage cells 110 of a storage module 100 can be provided. The resistance 202 can be varied in a temperature-dependent manner by mechanical means (e.g. bimetal) and/or by the appropriate selection of materials (negative temperature coefficient, NTC, materials). At low temperatures 201, relatively high resistance 202 can result in relatively high thermal generation, and thus in a relatively rapid heat-up of a storage cell 110. Upon the achievement of an optimum temperature 203, the resistance 202 can be reduced (e.g. by an appropriate form of construction), such that no further heating effects, or only minor heating effects, and corresponding electrical losses, occur.

FIG. 1A represents the use of temperature-dependent contact bridges 104 for the series-connected arrangement of storage cells 110. Optionally, temperature-dependent contact bridges 103 can also be used for the parallel connection of storage cells 110, in order to extract thermal energy on the basis of compensating currents between storage cells 110.

By the employment of contact bridges 104 for the provision of temperature-dependent electrical resistance 202 between the terminals 111, 112 of storage cells 110, costs, weight and structural space can be saved by the omission of a dedicated heating system. Moreover, self-regulating optimization of the power delivery of a storage module 100 at low temperatures is achieved, with the simultaneous securing of low power losses, immediately when a target operating temperature is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage module for storing electrical energy, the storage module comprising:
   a first storage cell, a second storage cell, and a third storage cell, each having a positive terminal and a negative terminal; and
   a contact bridge, which connects one terminal of the first storage cell to one terminal of an opposite polarity of the second storage cell in an electrically conductive manner,
   a second contact bridge, which connects the one terminal of the first storage cell or the second storage cell to one terminal of a same polarity of the third storage cell, wherein
   the contact bridge and the second contact bridge are designed to reduce electrical resistance between electrically connected terminals of the first, second, and third storage cells, as the temperature rises.

2. The storage module as claimed in claim 1, wherein
   the contact bridge is designed to reduce the electrical resistance between a first temperature and a second temperature by a factor of 2, 3, 4 or more;
   the first temperature specifically lies between −30° C. and −10° C.; and
   the second temperature specifically lies between 10° C. and 30° C.

3. The storage module as claimed in claim 1, wherein
   the contact bridge comprises one or more materials having specific electrical resistance, which shows a negative temperature coefficient.

4. The storage module as claimed in claim 3, wherein the one or more materials comprise one or more of the following:
   a metal oxide, specifically of manganese, nickel, cobalt, iron, copper and/or titanium;
   a semiconductor material, specifically silicon, germanium, boron, selenium and/or tellurium; and
   a bonding semiconductor, specifically gallium arsenide, indium phosphide, indium antimonide, indium arsenide.

5. The storage module as claimed in claim 1, wherein
   the contact bridge comprises a contact part and compression device; and the compression device operates such that a force with which the contact part is compressed against one terminal of a storage cell rises as the temperature rises.

6. The storage module as claimed in claim 5, wherein
the compression device comprises a bimetallic strip in or on the contact part; and/or
the compression device comprises a compression spring having temperature-dependent expansion, which compression spring is designed to compress the contact part against one terminal of the first or second a storage cell.

7. The storage module as claimed in claim 1, wherein
the storage module is designed to deliver a module current on terminals of the storage module; and
the contact bridge is arranged such that at least a proportion of the module current flows via the contact bridge.

8. The storage module as claimed in claim 1, wherein
the first storage cell comprises a cell winding, which is directly connected to the positive and the negative terminal, and which is at least partially enclosed by an insulating layer and a cell container;
the storage module comprises a housing, in which the first storage cell and the second storage cell are arranged;
the storage module comprises a plurality of groups of one or more storage cells, which are respectively mutually coupled via the contact bridge or a third contact bridge, in order to constitute a series circuit arrangement of the groups of one or more storage cells; and
the storage module comprises a positive terminal and a negative terminal, which are constituted by a positive terminal of the first, second, third, or a fourth storage cell or by a negative terminal of the first, second, third, or a fourth storage cell.

9. The storage module as claimed in claim 1, wherein
the first storage cell comprises a cell winding, which is directly connected to the positive and the negative terminal, and which is at least partially enclosed by an insulating layer and a cell container.

10. The storage module as claimed in claim 1, wherein
the storage module comprises a housing, in which the first storage cell and the second storage cell are arranged.

11. The storage module as claimed in claim 1, wherein
the storage module comprises a plurality of groups of one or more storage cells, which are respectively mutually coupled via the contact bridge or a third contact bridge, in order to constitute a series circuit arrangement of the groups of one or more storage cells.

12. The storage module as claimed in claim 1, wherein
the storage module comprises a positive terminal and a negative terminal, which are constituted by a positive terminal of the first, second, third, or a fourth storage cell or by a negative terminal of the first second, third, or a fourth storage cell.

* * * * *